Figures 1, 2:
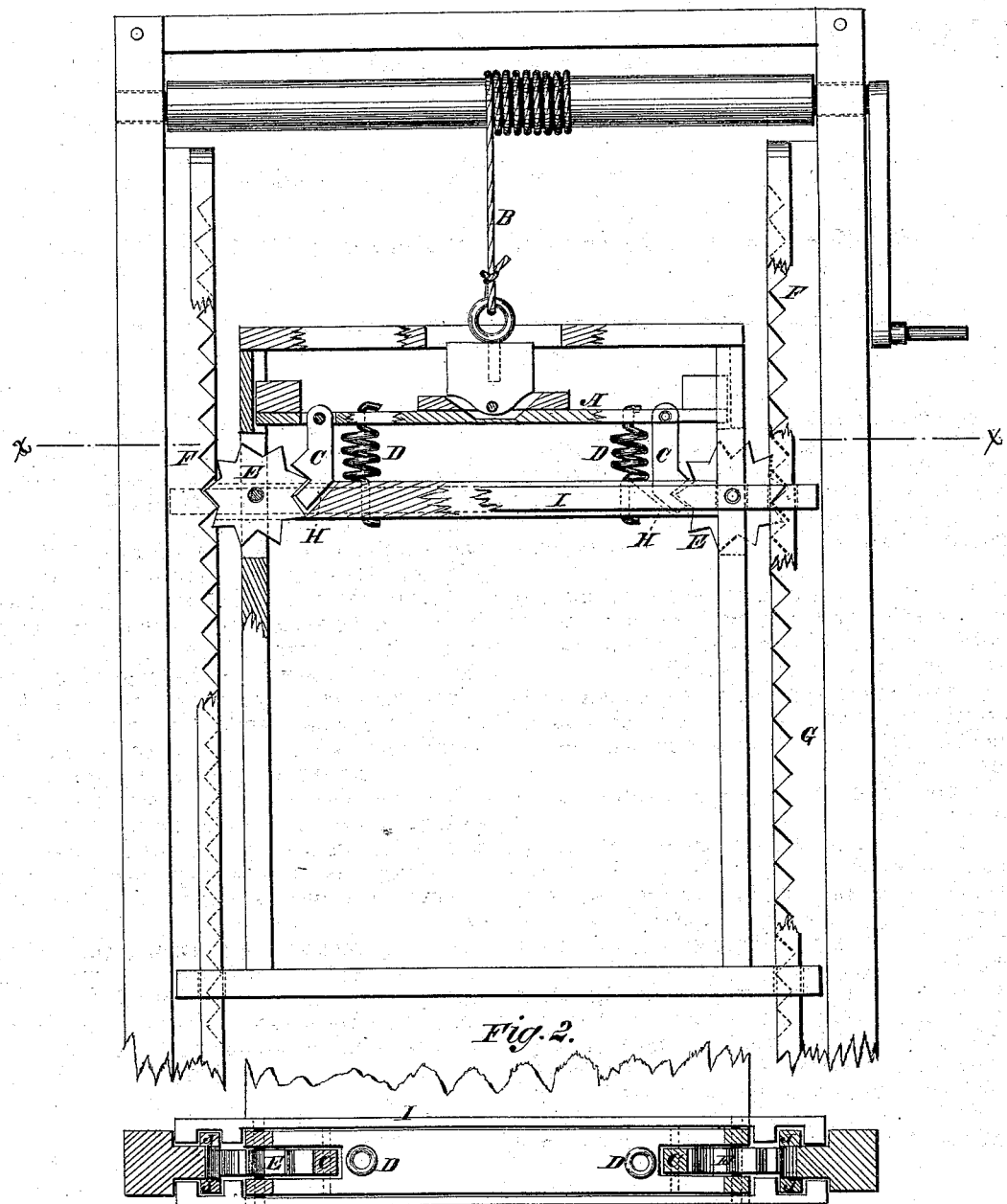

C. L. PAGE.
Safety Attachments to Elevators.

No. 153,906 — Patented Aug. 11, 1874.

WITNESSES:
INVENTOR:

UNITED STATES PATENT OFFICE.

CARLOS L. PAGE, OF CAMBRIDGEPORT, MASSACHUSETTS.

IMPROVEMENT IN SAFETY ATTACHMENTS TO ELEVATORS.

Specification forming part of Letters Patent No. 153,906, dated August 11, 1874; application filed March 21, 1874.

*To all whom it may concern:*

Be it known that I, CARLOS L. PAGE, of Cambridgeport, in the county of Middlesex and State of Massachusetts, have invented a new and Improved Safety Attachment to Elevators, of which the following is a specification:

The invention relates to means for guiding the elevator and keeping the notched or toothed wheels in gear with vertical parallel rack-bars, as hereinafter described.

Figure 1 is partly a side elevation and partly a sectional elevation of my improved elevator, and Fig. 2 is a horizontal section taken on the line $x$ $x$ of Fig. 1.

Similar letters of reference indicate corresponding parts.

A is the bar or beam in the top of the elevator, to which the hoisting-rope B is connected. It is capable of moving up and down a little in the elevator-frame, and has a toothed wedge, C, near each end projecting downward from it. It also has springs D for forcing it downward when the strain of the hoisting-rope ceases. E represents toothed wheels on the elevator, gearing with the toothed racks F on the elevator-ways G. Below the wedges, which are beveled at the lower end, are inclined bearings H on the elevator-frame, against which the beveled ends of the wedges are forced by the wheels after dropping into gear with them when the rope breaks, and thus lock the wheels and prevent the descent of the elevator. When the strain is on the bar A it holds the wedges up out of gear with the wheels, so as not to interfere with the regular operations of the elevator. I represents the strong bars on the elevator-frame projecting along the sides of the ways to prevent the wheels from moving laterally out of gear with the racks; J, the ribs on the sides of the ways, which the bars I engage by notches, so as to hold the elevator and ways from springing away from each other when the locking takes place, to prevent the gears from slipping.

I do not claim the combination of spring locking pawls or arms with the toothed wheels and vertical guides of an elevator; but

Having thus described my invention, I claim as new and desire to secure by Letters Patent—

The combination and arrangement of the bar A, pivoted toothed wedges C, springs D, toothed wheels E, toothed racks F, bars I, and ribs J, to form a safety-elevator, constructed and operating in the manner specified.

CARLOS L. PAGE.

Witnesses:
CHARLES L. PIKE,
WARREN H. DOW.